(12) United States Patent
Weis et al.

(10) Patent No.: US 8,109,449 B2
(45) Date of Patent: Feb. 7, 2012

(54) OUTLET NOZZLE

(75) Inventors: Christoph Weis, Mullheim (DE); Oliver Denzler, Bottmingen (CH); Alexander Stein, Ihringen (DE); Martin Fangmeier, Auggen (DE)

(73) Assignee: Neoperl GmbH, Mulheim (DE)

( * ) Notice: Subject to any disclaimer, the term of this patent is extended or adjusted under 35 U.S.C. 154(b) by 283 days.

(21) Appl. No.: 12/373,985

(22) PCT Filed: Jul. 13, 2007

(86) PCT No.: PCT/EP2007/006232
§ 371 (c)(1),
(2), (4) Date: Jan. 15, 2009

(87) PCT Pub. No.: WO2008/009390
PCT Pub. Date: Jan. 24, 2008

(65) Prior Publication Data
US 2009/0277521 A1    Nov. 12, 2009

(30) Foreign Application Priority Data
Jul. 19, 2006   (DE) ............ 20 2006 011 149 U

(51) Int. Cl.
*E03C 1/08* (2006.01)
(52) U.S. Cl. ................... 239/428.5; 239/581.1

(58) Field of Classification Search .......... 239/390–397, 239/569, 581.1, 600, DIG. 19, 428.5, 436, 239/443, 444, 446
See application file for complete search history.

(56) References Cited

U.S. PATENT DOCUMENTS

| | | | |
|---|---|---|---|
| 3,831,860 A * | 8/1974 | Gullaksen et al. ............ 239/500 |
| 4,145,004 A * | 3/1979 | Krizik ............................ 239/499 |
| 4,303,201 A * | 12/1981 | Elkins et al. ................... 239/381 |
| 4,375,225 A * | 3/1983 | Andersson ............... 137/625.17 |
| 5,111,994 A * | 5/1992 | Gonzalez .................... 239/428.5 |
| 5,896,601 A * | 4/1999 | Humpert et al. .................. 4/677 |
| 6,135,152 A * | 10/2000 | Knapp ...................... 137/625.41 |
| 2006/0016001 A1 | 1/2006 | Zhao |

FOREIGN PATENT DOCUMENTS
GB    2272746    5/1994
* cited by examiner

*Primary Examiner* — Davis Hwu
(74) *Attorney, Agent, or Firm* — Volpe and Koenig, P.C.

(57) ABSTRACT

An outlet nozzle (1) which can be attached to an outlet fitting, or to a similar outlet end of a sanitary water line, which includes a valve unit (3), which is displaceable between a blocking position, closing the water line, and an open position, releasing the water line, wherein at least one aerator unit having a jet divider, homogenizer, and/or flow rectifier, a shower unit, or similar jet former, is provided in the outlet nozzle (1). The outlet nozzle (1) is characterized by the low space requirement and production costs thereof.

17 Claims, 4 Drawing Sheets

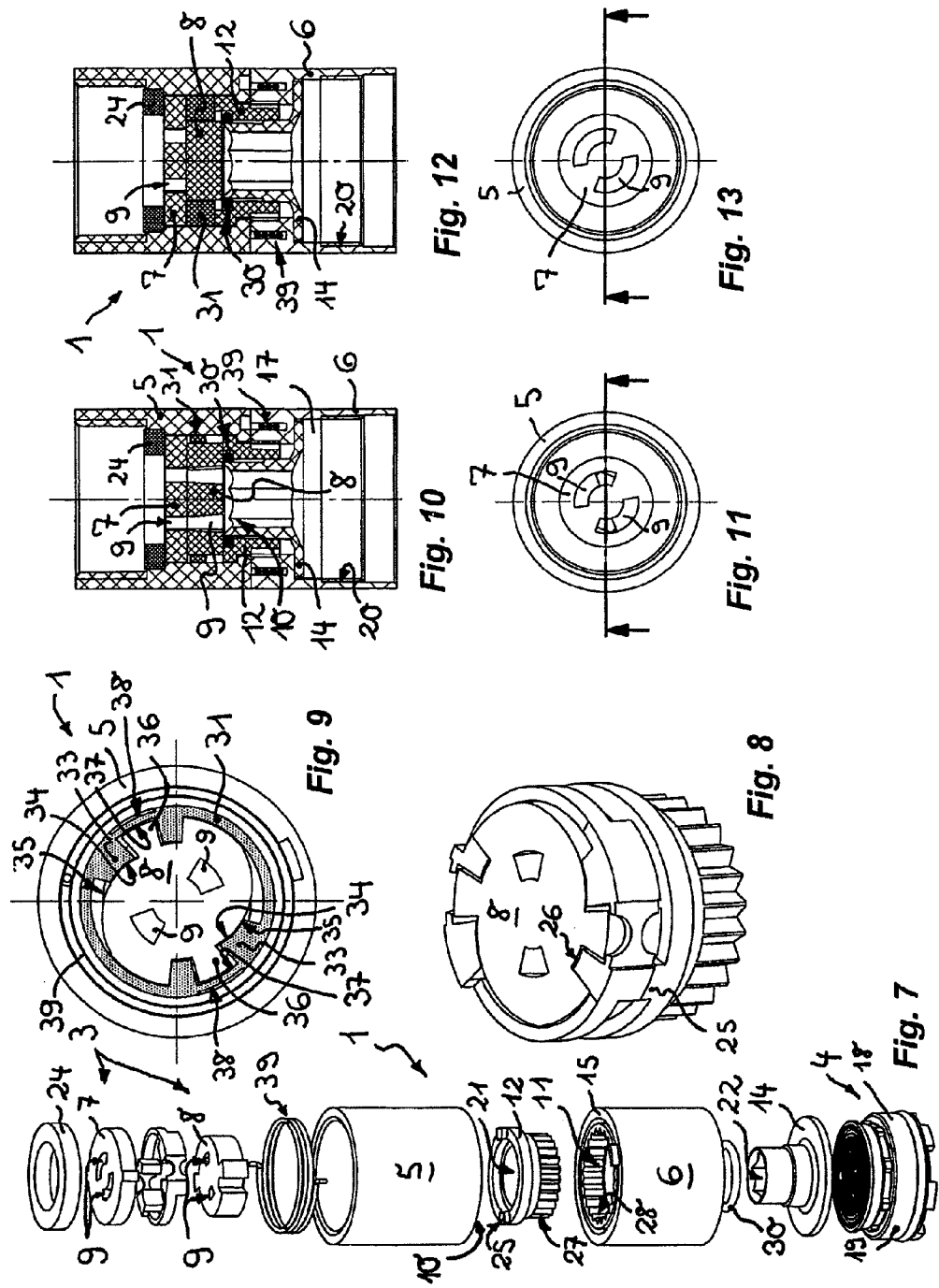

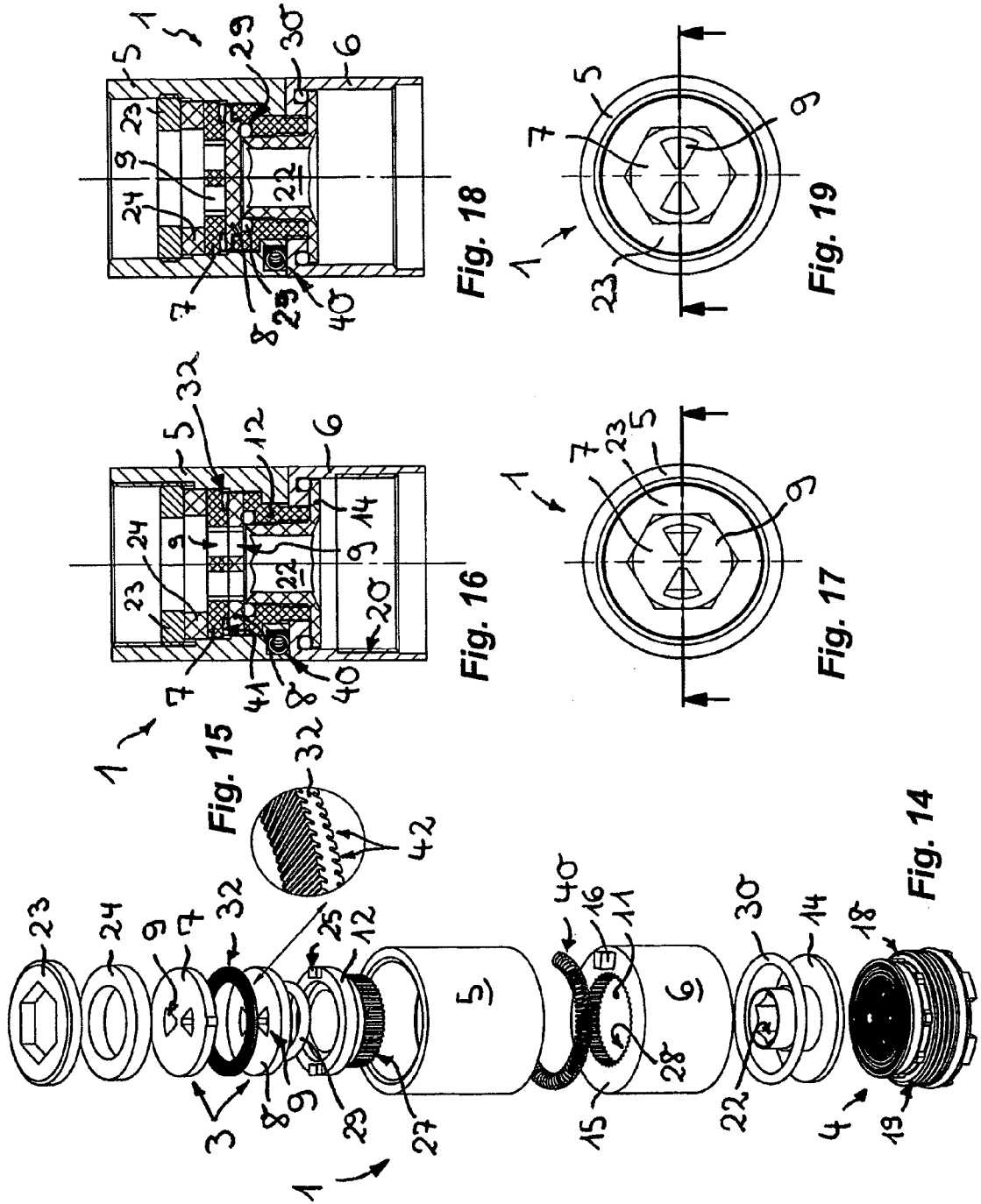

OUTLET NOZZLE

BACKGROUND

The invention relates to an outlet nozzle that can be attached to the outlet end of a sanitary water line.

Outlet nozzles that can be attached to the outlet end of a sanitary outlet fitting are already known. In these outlet nozzles, a jet regulator can be used that should promote the formation of a homogenous, soft, and advantageously non-spraying water jet. Here, in the end region of the outlet fitting facing away from the outlet nozzle there is usually a valve unit that can move between an open position and a closed position.

The production of such connection fittings, the space-saving and shapely housing of the valve unit, and the attachment of an additional jet regulator with the help of an outlet nozzle have considerable spatial requirements and production costs that, however, are not justifiable and possible overall.

SUMMARY

Therefore, there is the objective of creating an outlet nozzle of the type noted above that reduces the spatial requirements and production costs required for use in the region of the water outlet, without which significant functional losses would be associated.

The solution according to the invention for this objective is provided by the features of the relevant Claim 1.

The outlet nozzle according to the invention can be attached to the outlet end of a sanitary water line. Here, in the outlet nozzle according to the invention there is not only at least one jet regulator unit with a jet divider, homogenizing device, and/or flow rectifier, a shower unit, or a similar jet former, but the outlet nozzle according to the invention also has a valve unit that can move between a blocking position closing the water line and an open position releasing the water line. This valve unit makes unnecessary a sanitary outlet fitting that typically has a relatively voluminous valve unit on its fitting end region facing away from the outlet nozzle. The outlet nozzle according to the invention therefore promotes a space-saving and cost-saving configuration in the region of the water outlet.

So that the outlet nozzle according to the invention can take over the typical functions of a regularly significantly larger water outlet fitting, it is useful when the valve unit is constructed as a control valve that allows the regulation of the quantity of liquid flowing through the control valve per unit of time.

Here it is especially advantageous when the valve unit has at least two contacting valve disks, each with at least one disk opening, and the valve disks can be rotated relative to each other between a blocking position in which the disk bodies of the valve disks cover the one or more disk openings of the adjacent valve disk in a sealing way and at least one open position in which the disk openings of the valve disks are aligned with each other at least in some regions. Such a valve unit made from two contacting valve disks can have a relatively space-saving construction.

The valve disks can contact each other tightly and simultaneously so that they can rotate, if at least one valve disk is constructed as a ceramic or plastic disk.

It is especially advantageous when the outlet nozzle is constructed with at least two parts and has a connection part that can be attached to the outlet end of the water line and also an adjacent holder part. Here, a preferred embodiment according to the invention provides that the valve unit is arranged in the connection part or in the holder part and that the jet regulator unit is provided in the other part of the outlet nozzle. A special advantage of the outlet nozzle according to the invention is that the water outlet of the outlet fitting can be opened or closed when necessary, without the risk of the jet former located in a part of the outlet nozzle becoming unscrewed. Here, the outlet nozzle can be activated without a projecting fitting handle also being necessary.

For activating the valve unit located in the interior of the outlet nozzle according to the invention, it is useful if the connection part and the holder part can be rotated for rotating the valve disks relative to each other.

Because the connection part is typically screwed tightly on the outlet end of the sanitary water line, it is useful when the holder part is held so that it can rotate on the connection part and when the holder part is in rotating drive connection with at least one valve disk.

One preferred embodiment according to the invention provides that in the connection part there is a catch that can be connected locked in rotation with a valve disk and that can be connected to a catch counter part in the holder part. This embodiment also provides that the catch and the catch counter part hold the parts against each other so that they can rotate relative to each other.

In order to be able to exchange the jet regulator unit when necessary, it is useful when the holder part has a front end, open holder cavity in which the jet regulator unit can be inserted, advantageously in a detachable way.

It is useful when the jet regulator unit has a jet regulator housing in whose interior the jet divider, the homogenizing device, and/or the flow rectifier is provided.

The jet regulator unit can be housed quickly and easily in the outlet nozzle, when an external thread is provided on the outer periphery on the jet regulator housing, wherein this external thread corresponds to an internal thread in the holder part.

One improvement according to the invention that is itself patentable provides that the valve unit can move from the blocking position into an open position against a restoring force and that at least one friction element is provided for a damped or delayed restoring movement or for time-delayed release of the restoring movement caused by the restoring force. In this improved embodiment, the valve unit can be moved back into the blocking position practically automatically from its open position, wherein at least one friction element provides the time-delayed release of the restoring movement caused by the restoring force. In this improved embodiment, a defined quantity of water is made available over a defined time span to the user that has placed the valve unit into its open position through a rotating movement, before the valve unit provided in the outlet nozzle closes practically automatically and without further action of the user. Such an outlet nozzle equipped with a self-closing device can be advantageously inserted in publicly accessible regions.

Here, at least one spring-elastic and/or at least one rubber-elastic restoring element can be provided as the restoring force. In order to allow the restoring movement of the outlet nozzle to become active, it is advantageous when the one or more restoring elements are active between the connection part and the holder part.

Here, at least one friction element can be active between the valve disks and/or at least one friction element can be active between the inner periphery of the connection part and the valve disk in rotational drive connection with the holder part.

One embodiment according to the invention provides that an annular friction element enclosing the valve disk is provided that has, on its inner periphery, at least one ramp surface that interacts with a peripheral region of the valve disk constructed as a sloped counter surface so that the ramp surface contacts the sloped counter surface during the restoring movement caused by the restoring force. When the ramp surface provided on the friction element contacts the sloped counter surface arranged on the valve disk, a restoring movement damped by defined friction is produced that holds the valve unit in its open position for a defined time span.

Here it is advantageous when the annular friction element can be widened when its one or more ramp surfaces are contacted advantageously such that the friction element is pressed increasingly on the inner periphery of the connection part.

It is preferred when at least one compression or tension spring and advantageously one leg spring is provided as the restoring force.

BRIEF DESCRIPTION OF THE DRAWINGS

Additional features of the invention emerge from the following description of an embodiment according to the invention in connection with the claims and also the drawing. The individual features can each be implemented alone or in combination to form an embodiment according to the invention.

Shown are.

DETAILED DESCRIPTION OF THE PREFERRED EMBODIMENTS

Figure 2:
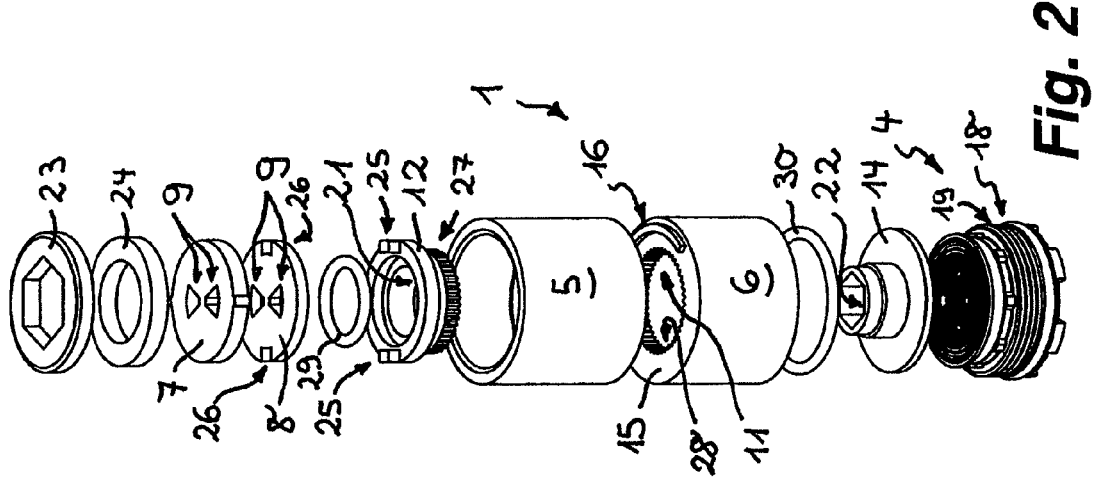
Figure 1:
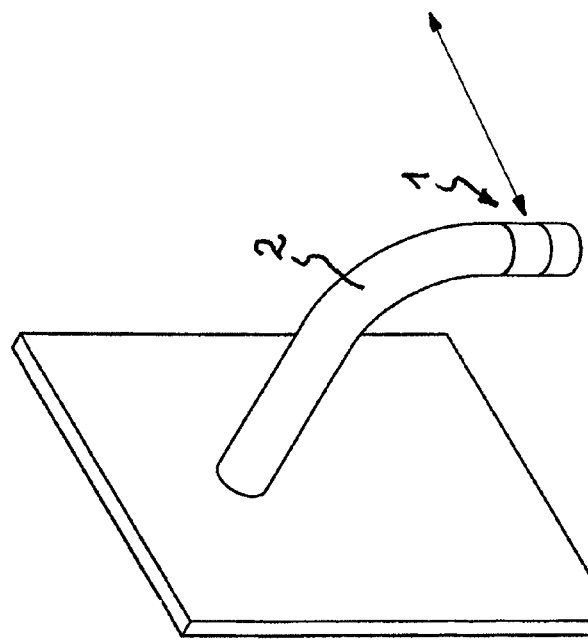
FIG. 1 a view of a water outlet tube used as an outlet end of a water line that carries an outlet nozzle on its downstream tube end, FIG. 2 an exploded perspective view of the outlet nozzle from FIG. 1 showing its individual parts, FIG. 3 a longitudinal section view of the outlet nozzle from FIGS. 1 and 2 shown in its open position, FIG. 4 an inflow-side top view of the outlet nozzle shown in its open position, FIG. 5 a longitudinal section view of the outlet nozzle shown in a closed or blocking position, FIG. 6 an inflow-side top view of the outlet nozzle shown in its blocking position, FIG. 7 a view of an outlet nozzle with a self-closing device that holds the water outlet in its open position for a limited time span before this self-closing device closes the water outlet again practically automatically, FIG. 8 a perspective diagram of the self-closing device arranged in the region of a valve disk for the outlet nozzle shown in FIG. 7, FIG. 9 a cross-sectional view of the outlet nozzle from FIGS. 7 and 8 in the region of its self-closing device, FIG. 10 a longitudinal section view of the outlet nozzle from FIGS. 7 to 9, wherein a valve unit provided in the outlet nozzle is located in its open position, FIG. 11 a top view of the valve unit of the outlet nozzle shown in FIGS. 7 to 10, FIG. 12 a longitudinal section view of the outlet nozzle from FIGS. 7 to 11, wherein the valve unit is located in its closed position, FIG. 13 a view of the outlet nozzle from FIGS. 7 to 12 in the closed position of its valve unit, FIG. 14 an exploded individual part diagram of an outlet nozzle and that here likewise has a self-closing device, FIG. 15 a detailed perspective view of a friction element arranged in the region of the valve unit of the outlet nozzle from FIG. 14, FIG. 16 a longitudinal section view of the outlet nozzle from FIG. 14, wherein a valve unit provided in the outlet nozzle is located in its open position, FIG. 17 a top view of the valve unit of the outlet nozzle shown in FIGS. 14 and 16 shown in its open position, FIG. 18 a longitudinal section view of the outlet nozzle from FIGS. 14 to 17 in the closed position of its valve unit, and FIG. 19 a top view of the outlet nozzle from FIGS. 14 to 18 shown in the closed position of its valve unit.
Figure 4:
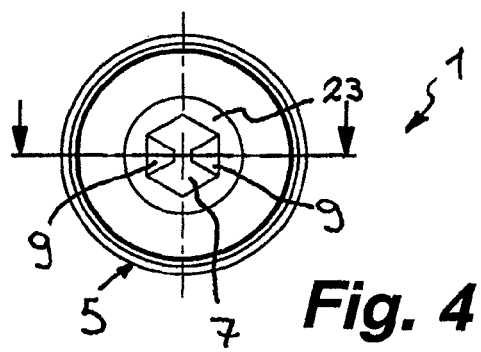

In FIGS. 1 to 6, an outlet nozzle 1 is shown that can be attached to the outlet end of a sanitary water line—constructed here, for example, as a water outlet pipe 2. The outlet nozzle 1 has a valve unit 3 that makes a closing and control valve connected in front in the inflow direction unnecessary. This valve unit 3 can be moved between a blocking position, closing the water line, and an open position, releasing the water line. In the outlet nozzle 1, there is also a jet regulator unit 4 that has a jet divider, a homogenizing device, and/or a flow rectifier and that should promote the formation of a homogeneous, soft, and/or non-spraying water jet.

From FIGS. 1 to 6, it becomes clear that the outlet nozzle 1 is constructed with at least two parts and has two sleeve-shaped parts 5, 6. While the valve unit 3 is provided in a connection part 5 that can be attached to the outlet end of the water line, the jet regulator unit 4 is connected after the valve unit 3 in the direction of flow and is arranged in the holder part 6.

The valve unit 3 provided in the connection part 5 is constructed as a control valve that permits a regulation of the quantity of liquid that can flow through the control valve per unit of time. The valve unit 3 has two contacting valve disks 7, 8, wherein each has two circular segment-shaped disk openings 9 arranged on opposite sides of the disk body. These valve disks 7, 8 can rotate between a blocking position and an open position; while in the blocking position shown in FIGS. 5 and 6, the disk bodies of the valve disks 7, 8 cover the disk openings 9 of the adjacent valve disk 7, 8 in a sealing manner, these disk openings 9 can be aligned with each other at least in some regions in an open position shown as an example in FIGS. 3 and 4.

For rotation of the valve disks 7, 8, the connection part 5 and the holder part 6 can be rotated relative to each other. Here, the holder part 6 that is held so that it can rotate on the connection part 5 fixed on the outlet end of the water line, is in rotational driving connection with at least one valve disk 8.

The sleeve-shaped parts 5, 6 have a pot-shaped construction on their front ends facing each other and are each equipped with a central pot base opening 10, 11. In the connection part 5 there is a catch 12 that passes through the pot base opening 10 of the connection part 5, grips under the edge region bounding the pot base opening 10, and projects in the direction toward the holder part 6. The catch end projecting in the direction toward the holder part 6 engages in the pot base opening 11 of the holder part 6 and can be connected to a catch counter part 14 that is T-shaped in longitudinal section and that engages, on its side, under the edge region 15 bounding the pot base opening 11 of the holder part 6. The catch 12 can also have a threaded shaft on which a nut can be screwed as a catch counter part for axial connection of the parts 5, 6.

In this way, the parts 5, 6 are held so that they can rotate on each other with the help of the catch 12 and its catch counter part 14. Here, a rotational guide is provided between the connection part 5 and the holder part 6 that is here formed by a guide pin 16. This guide pin projects on the outside on the pot base of one part 6 and engages in a guide groove provided on the outside on the other pot base and has a circular or circular section shape.

The holder part 6 has a holder cavity 17 that is open on the front end and in which the jet regulator unit 4 can be inserted advantageously in a detachable manner. The jet regulator unit 4 has a jet regulator housing 18 in whose interior there is a jet divider constructed, for example, as a perforated plate, a homogenizing device constructed, for example, by at least one lattice or network structure, and/or a flow rectifier that can be constructed, for example, by an outflow-side perforated plate with an advantageously honeycomb-like through-flow holes. Here, it is useful when the jet regulator housing has on the outer periphery an outer thread 19, wherein this outer thread 19 corresponds to an inner thread 20 in the holder part 6.

Figure 3:
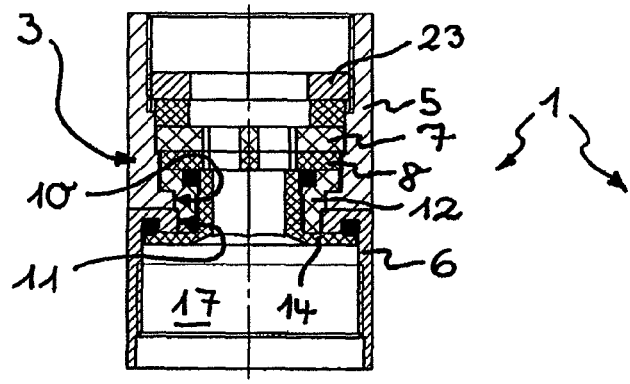
Figure 6:
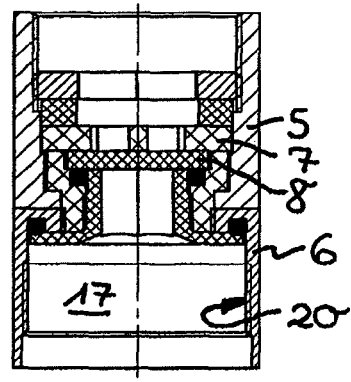

In the open position shown in FIG. 3, the water jet may flow through the disk openings 9 of the valve disks 7, 8, which are aligned with each other at least in some regions, in order to then be led through central through-flow openings 21, 22 in the catch 12 and catch counter part 14 to the jet regulator unit 4, where the water jet is processed to form a homogeneous, soft, and/or non-spraying water jet that can be aerated or not when needed and according to the construction of the jet regulator unit. The central through-flow openings 21, 22 here have a hexagonal opening cross section, so that in these through-flow openings 21, 22, during the assembly of the outlet nozzle according to the invention, corresponding hexagon socket screw keys can be placed.

Figure 5:
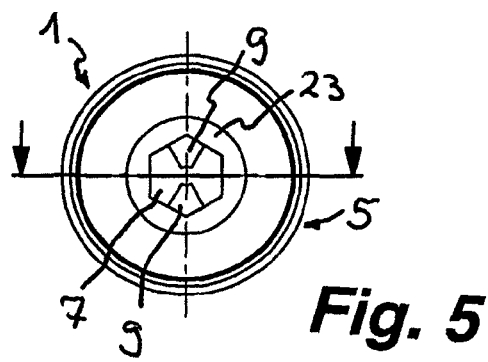

From FIGS. 3 and 5 it becomes clear that the valve disks are held in the sleeve interiors of the connection part 5 by a screw or securing ring 23 that here corresponds to an inner thread on the inner periphery of the connection part 5. Here, the securing ring 23 can be sealed relative to the adjacent valve disk 5 and/or relative to the pipe end of the water outlet pipe 2 by a sealing ring 24. The catch 12 has at least one catch pin 25 that projects on the front end and that engages in a rotationally locked way in a catch opening 26 on the adjacent valve disk 8. The catch 12 here has two catch pins 25 that are arranged on opposite sides of the catch 12 and that each engage in a catch opening 26 that is open on the edge side in the valve disk 8. The valve disk 7 is held locked in rotation on its side in the connection part 5.

The valve disks 7, 8 are here constructed as ceramic disks that contact each other tightly and nevertheless can rotate on each other. The catch 12 has, on the outer periphery on its catch end passing through the pot base openings, profiling 27 that engages with a positive fit or is locked in rotation in counter profiling 28 on the edge region of the holder part bounding the pot base opening. To avoid creep flows, the catch and the adjacent valve disk and also the catch counter piece are each sealed relative to the inner pot base end face of the holder part by sealing rings 29, 30.

In FIGS. 7 to 19, two different constructions of an outlet nozzle 1 are shown. These outlet nozzles 1 that can also be attached to the outlet end constructed as a water outlet pipe in a sanitary water line have a valve unit 3 that can be moved against a restoring force from the blocking position into an open position, wherein one friction element 31, 32 is provided for time-delayed release of the restoring movement caused by the restoring force. In the outlet nozzles 1 shown in FIGS. 7 to 19, the valve unit 3 is rotated into its open position when needed, in order to then move automatically into its closed position by a restoring force delayed due to the friction element 31 or 32. The outlet nozzles 1 according to FIGS. 7 to 19 are therefore predestined for use, in particular, in publicly accessible sanitary regions due to their automatically closing valve unit 3, where a defined quantity of water is provided to the appropriate user and excessive water consumption is to be prevented.

In their configuration, the outlet nozzles 1 shown in FIGS. 7 to 19 essentially match the outlet nozzle 1 from FIGS. 1 to 6. The outlet nozzles 1 according to FIGS. 7 to 19 also have a two-part construction and have two sleeve-shaped parts 5, 6. While the valve unit 3 is provided in a connection part 5 that can be attached to the outlet end of the water line, in the holder part 6 there is a jet regulator unit 4 connected after the valve unit 3 that should promote the formation of a homogeneous, soft, and non-spraying water jet. This jet regulator unit 4 has, for this purpose, a jet divider, a homogenizing device, and/or a flow rectifier.

The valve unit 3 provided in the connection part 5 of the outlet nozzles 1 according to FIGS. 7 to 19 has two contacting valve disks 7, 8 that each have two circular segment-shaped disk openings 9 arranged on opposite sides of the disk body. These valve disks 7, 8 can be rotated between a blocking position and an open position; while in the blocking position shown in FIGS. 12 and 13 or 18 and 19, the disk bodies of the valve disks 7, 8 cover the disk openings 9 of the adjacent valve disk in a sealing manner, these disk openings 9 can be aligned with each other at least in some regions in the open positions shown in FIGS. 10 and 11 or 16 and 17.

For rotating the valve disks 7, 8, the connection part 5 and the holder part 6 can be rotated relative to each other. Here, the holder part 6 that is held on the connection part 5 fixed on the outlet end of the water line so that it can rotate, is in rotational driving connection with at least one valve disk 8. For this purpose, in the connection part 5 there is a catch 12 that passes through the pot base opening 10 of the pot-shaped connection part 5 that grips under the edge region bounding the pot base opening 10 and that projects in the direction toward the holder part 6. The catch end projecting in the direction toward the holder part 6 engages in the pot base opening 11 of the holder part 6 and can be connected to a catch counter part 14 that has a T-shaped longitudinal section and that engages, on its side, under the edge region 15 bounding the pot base opening 11 of the holder part 6. The catch 12 has at least one catch pin 25 that projects on the front end and that engages locked in rotation in a catch opening 26 on the adjacent valve disk 8. The valve disks 7, 8 of the outlet nozzle shown in FIGS. 7 to 19 are also constructed as ceramic disks that contact tightly against each other and nevertheless can rotate on each other.

The outlet nozzle 1 shown in FIGS. 7 to 13 has a friction element 31 that is active between the inner periphery of the connection part 5 and the valve disk 8 in rotational drive connection with the holder part 6. For this purpose, the annular friction element 31 enclosing the valve disk 8 has, on two deformations 33 projecting on opposite sides of its inner periphery, an ramp surface 34 that interacts with an associated periphery region of the valve disk 8 constructed as a sloped counter surface 35 such that the ramp surfaces 34 contact the sloped counter surfaces 35 during the restoring movement to the restoring force, wherein the annular friction element 31 can be widened when its ramp surfaces 34 contact the sloped counter surfaces 35 such that the friction element 31 is increasingly pressed onto the inner periphery of the connection part 5. The ramp surfaces 34 are also moved into their original position by the restoring movement of the valve disks 7, 8 caused by the restoring force. Catch pins 36 project to the valve disk 8, wherein these catch pins each engage with a positive fit in a catch holder 37 on the inner periphery of the annular friction element 31. So that the valve disk 8 can be rotated relative to the friction-fit friction element 31 on the inner periphery of the connection part 5, the friction element 31 has, in the region of its catch holders 37, a material weakening 38 that permits an elongation of the restoring element 31 acting as a pretensioned rubber spring during the restoring movement.

Through a rotational movement oriented in the counterclockwise direction on the holder part 6 that is also transmitted via the catch 12 and its catch pin 25 onto the valve disk 8, the friction element 31 is expanded in the region of its material weakening 38 and the ramp surfaces 34 provided in the friction element 31 can be rotated into their "on" setting. If the holder part 6 is released by the user, the rotational direction can reverse, wherein the ramp surfaces 34 and sloped counter surfaces 35 acting as brake wedges are activated and press onto the stationary outer contours so that a restoring movement damped by a defined friction is produced.

In the outlet nozzle 1 according to FIGS. 7 to 13, the restoring force is generated by a leg spring 39 that is held with its one spring end on the connection part 5 and with its other spring end on the holder part 6.

The outlet nozzle 1 according to FIGS. 14 to 19 has a friction element 32 that is provided between the valve disks 7, 8. Here, the restoring force is generated by a compression spring 40 that is also active between the connection part 5 and the holder part 6. The annular friction element 32 arranged in an annular groove 41 on the bottom side of the valve disk 7 has, on its top side loading the valve disk 7 and on its bottom side contacting the valve disk 8, profiling shown in greater detail in FIG. 15 and formed from radially oriented plates 42 that generates a braking effect and is used as a friction damper during the restoring movement caused by the restoring spring such that the outlet nozzle 1 according to FIGS. 14 to 19 remains for a defined time period in an open position, in order to close the valve unit 13 after its damped restoring movement back automatically in the closed position.

The invention claimed is:

1. Outlet nozzle (1) that can be attached to an outlet fitting or a similar outlet end (2) of a sanitary water line, comprising a valve unit (3) that can move between a blocking position, closing the water line, and an open position, releasing the water line, the valve unit (3) has at least two valve plates (7, 8) contacting each other each with at least one plate opening (9), and the valve plates (7, 8) can be rotated relative to each other between the blocking position in which disk bodies of the valve plates (7, 8) cover the at least one plate opening (9) of the adjacent valve plate (7, 8) in a sealing manner and at least one open position in which the plate openings (9) of the valve plates (7, 8) are aligned with each other at least in some regions and in the outlet nozzle (1) at least one jet regulator unit (4) is provided with at least one of a jet divider, homogenizing device, or flow rectifier, a shower unit, or a jet former, wherein the outlet nozzle (1) has at least a two-part construction with a connection part (5) that can be attached to the outlet end of the water line and an adjacent holder part (6) the connection part (5) and the holder part (6) can be rotated relative to each other for rotating the valve plates (7, 8), the connection part comprising a catch (12) that can be connected locked in rotation with one of the valve plates (7, 8), which can be connected to a catch counter piece (14) in the holder part (6), the catch (12) and the catch counter part (14) hold the connection and holder parts (5, 6) against each other so that they can rotate relative to each other.

2. Outlet nozzle according to claim 1, wherein the jet regulator unit (4) is connected before or after the valve unit (3) in a direction of flow.

3. Outlet nozzle according to claim 1, wherein the valve unit (3) comprises a control valve that allows regulation of a quantity of fluid flowing through the control valve (3) per unit of time.

4. Outlet nozzle according to claim 1, wherein at least one of the valve plates (7, 8) is constructed as a ceramic or plastic plate.

5. Outlet nozzle according to claim 1, wherein the valve unit (3) is arranged in the connection part (5) or in the holder part, and the jet regulator unit (4) is provided in the other of the connection part or the holder part (6) of the outlet nozzle (1).

6. Outlet nozzle according to claim 1, wherein the holder part (6) is held on the connection part (5) so that it can rotate, and the holder part (6) is in rotational driving connection with at least one of the valve plates (7, 8).

7. Outlet nozzle according to claim 1, wherein the holder part (6) has a front-end open holding cavity (17), and in the holding cavity (17), the jet regulator unit (4) can be detachably inserted.

8. Outlet nozzle according to claim 1, wherein the jet regulator unit (4) has a jet regulator housing (18) with a housing interior in which the at least one of the jet divider, the homogenizing device, or the flow rectifier is provided.

9. Outlet nozzle according to claim 8, wherein an external thread is provided on the jet regulator housing (18) on an outer periphery, wherein the external thread (19) corresponds to an internal thread (20) in the holder part (6).

10. Outlet nozzle according to claim 1, wherein the components of the outlet nozzle are produced essentially from plastic.

11. Outlet nozzle according to claim 1, wherein the valve unit (3) can be moved against a restoring force from the blocking position into an open position and at least one friction element (31, 32) is provided for a damped or time-delayed restoring movement or for time-delayed release of the restoring movement caused by the restoring force.

12. Outlet nozzle according to claim 11, wherein at least one of a spring-elastic or a rubber-elastic restoring element is provided as the restoring force.

13. Outlet nozzle according to claim 11, wherein the outlet nozzle (1) has at least a two part construction with a connector part (5) that can be attached to the outlet end of the water line and an adjacent holder part (6), and the at least one restoring element, is active between the connection part (5) and the holder part.

14. Outlet nozzle according to claim 11, wherein the at least one friction element (32) is active between valve plates of the valve unit (3) or the at least one friction element (31) is active between an inner periphery of connection part (5) of the outlet nozzle (1) and a valve plate (8) of the valve unit (3) in rotational driven connection with a holder part (6) of the outlet nozzle (1).

15. Outlet nozzle according to claim 14, wherein the friction element (31) is annular and encloses the valve plate (8) and has at least one ramp surface (34) on an inner periphery that interacts with a peripheral region of the valve plate (8) constructed as a sloped counter surface (35) such that the ramp surface (34) contacts the sloped counter surface (35) during the restoring movement caused by the restoring force.

16. Outlet nozzle according to claim 15, wherein the annular friction element (31) is widened when the one or more ramp surfaces (34) are contacted such that the friction element (31) is increasingly pressed onto the inner periphery of the connection part (5).

17. Outlet nozzle according to claim 11, wherein, at least one compression spring or tension spring (39, 40) generates the restoring force.

* * * * *